United States Patent

Shibata

[11] Patent Number: 5,822,317
[45] Date of Patent: Oct. 13, 1998

[54] PACKET MULTIPLEXING TRANSMISSION APPARATUS

[75] Inventor: Koichi Shibata, Kokubunji, Japan

[73] Assignee: Hitachi, Ltd., Tokyo, Japan

[21] Appl. No.: 700,163

[22] Filed: Aug. 20, 1996

[30] Foreign Application Priority Data

Sep. 4, 1995 [JP] Japan ............................ 7-226231

[51] Int. Cl.⁶ .................................................. H04L 12/56
[52] U.S. Cl. .......................... 370/474; 370/395; 370/473
[58] Field of Search .................................. 370/389, 395, 370/394, 473, 474, 471, 472

[56] References Cited

U.S. PATENT DOCUMENTS

5,467,342  11/1995  Logston et al. ....................... 370/395
5,521,927   5/1996  Kim et al. ............................. 370/474
5,533,021   7/1996  Branstad et al. ...................... 370/396

Primary Examiner—Chau Nguyen
Assistant Examiner—Ken Vanderpuye
Attorney, Agent, or Firm—Antonelli, Terry, Stout & Kraus, LLP

[57] ABSTRACT

A sender apparatus in a packet multiplexing transmission apparatus for packetizing lengthy information supplied from a plurality of information channels for multiplex transmission. Each packet is affixed with a time stamp for establishing synchronization in operation between the sender and a receiver. After multiplexing the data for transmission, packets are generated and then affixed with the respective time stamps in order to make constant a delay time which intervenes between the affixation of the time stamp to the packet and the send-out thereof onto a network.

7 Claims, 11 Drawing Sheets

| 601 CHANNEL IDENTIFIER | 602 SEND REQUEST TIME | 603 PACKET LENGTH | 604 PACKET SENDING INTERVAL | 605 CHANNEL STATUS | 606 PACKET ID NUMBER | 607 STORING LOCATION | 608 RESIDUAL DATA LENGTH | 609 PACKET HEADER, ETC. |
|---|---|---|---|---|---|---|---|---|
| A | 12:23 | 200 | 0:11 | SENDING | 5 | AAD2h | 140 | 042F3EA2DDh |
| B | | | | SENDING | 3 | | | |
| C | | | | SENDING | 4 | | | |
| D | | | | SEND ENDED | 15 | | | |
| A | | | | SEND WAITING | 0 | | | |

PACKET MULTIPLEXING TRANSMISSION APPARATUS

BACKGROUND OF THE INVENTION

The present invention relates generally to a packet multiplexing transmission apparatus for packetizing information of plural channels for transmission in multiplex. More particularly, the invention is concerned with an improvement of a time stamp affixing facility adopted in the packet multiplexing transmission apparatus for realizing precise synchronization in operation between a sender apparatus and a receiver apparatus interconnected by a network.

In the packet transmission of information such as video, sound or the like information, there is required a mechanism for establishing synchronization between the operation at the sender side and that of the receiver side. Unless such synchronizing mechanism is provided, irregularity or non-uniformity will take place with regards to the packet receiving time interval or time points. In that case, there may arise such a problem that overflow of transmitted information occurs at the receiver side because of incapability of disposing of the information as received and/or a problem that information as required at a desired time point is not available at the receiver at that time point. By way of example, in the case of transmission of video or sound information, absence of the synchronizing mechanism may give rise to a problem that interruption takes place in the picture sequence or sound sequence or the picture is displayed repeatedly or noise is generated.

As one of the most simplified measures for establishing synchronization between the sender side and the receiver side, there may be mentioned a scheme according to which a clock employed at the sender apparatus is reproduced in the receiver apparatus on the basis of a modulated carrier frequency and received data itself by resorting to a PLL (Phase-Locked Loop) or the like technique.

However, in the packet transmission, when the interval at which the packets are transmitted is not constant, it is difficult to reproduce in the receiver apparatus the clock used in the sender apparatus solely with the conventional PLL technique. Such situation will take place, for example, in the ATM packet transmission (i.e., packet transmission in asynchronous transfer mode) in which picture data is transformed into compressed codes which are then packetized for the transmission. Under the circumstances, the International Organization for Standardization (i.e., the ISO for short) recommends that a time stamp be added or affixed to the packet in order to effectuate synchronization between the sender side and the receiver side in the packet transmission of compressed video data (see IS 13818-1).

A typical data transmission system which conforms to the standardization recommendation mentioned above will be described by reference to FIG. 2.

Figure 2:
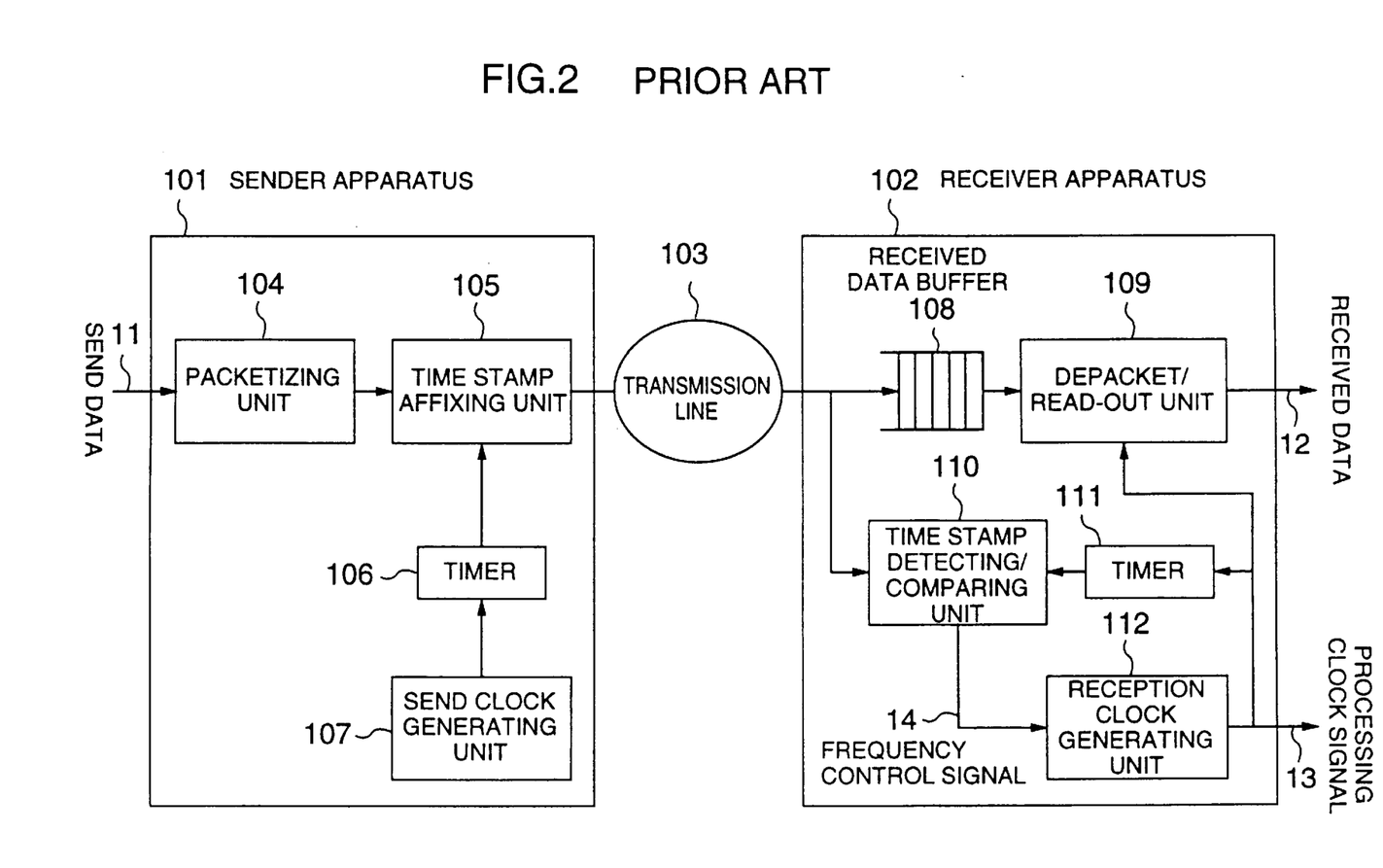
FIG. 2 is a block diagram illustrating a configuration of a conventional data transmission system including clock synchronizing mechanisms at a sender side and a receiver side, respectively.

Referring to the FIG. 2, transmission data (i.e., data to be transmitted) 11 furnished from an information source is processed by a sender apparatus 101 to be subsequently sent to a receiver apparatus 102 via a transmission line 103. A clock signal which is in synchronism with operation of the sender apparatus 101 is reproduced in the receiver apparatus 102 to be outputted as a processing clock signal (clock signal employed in the succeeding signal processing) 13 together with the received data 12.

In the sender apparatus 101, the transmission data 11 is first packetized by a packetizing unit 104. In succession, a time stamp is added or affixed to the packet by a time stamp affixing unit 105. Incidentally, the time stamp is generated by a timer 106 which operates at a standard clock frequency generated by a send clock generating unit 107. The time stamp contains information of "hour", "minute" and "second" and may additionally contain information of "millisecond" in dependence on the accuracy or precision as demanded. The time stamp is then affixed to each of the packets.

On the other hand, in the receiver apparatus 102, the packet received from the transmission line 103 is stored temporarily in a received data buffer 108 and at the same time the time stamp of that packet is extracted by a time stamp detecting/comparing unit 110. The time stamp as extracted is compared with the time outputted by a timer 111 which is incorporated in the receiver apparatus 102 and which operates at a clock frequency generated by a reception clock generating unit 112.

When the time stamp as received indicates a time preceding the time indicated by the timer 111 of the receiver apparatus 102, a frequency control signal 14 is generated to the reception clock generating unit 112 for controlling it so that the clock frequency increases. In the opposite case, the frequency control signal 14 for decreasing the clock frequency is supplied to the reception clock generating unit 112. In this manner, the output frequency of the reception clock generating unit 112 is automatically controlled such that the time indicated by the timer 111 of the receiver apparatus 102 coincides with the time information of the time stamp affixed to the packet as received, to be thereby output as the processing clock signal 13. The packet once stored in the received data buffer 108 is read out by a depacket/read-out unit 109 operating at the clock frequency corresponding to the processing clock signal 13, and outputted as the received data 12. By virtue of the mechanism described above, the clock generated by the send clock generating unit 107 is brought into synchronism with the clock generated by the reception clock generating unit 112.

Figure 3:
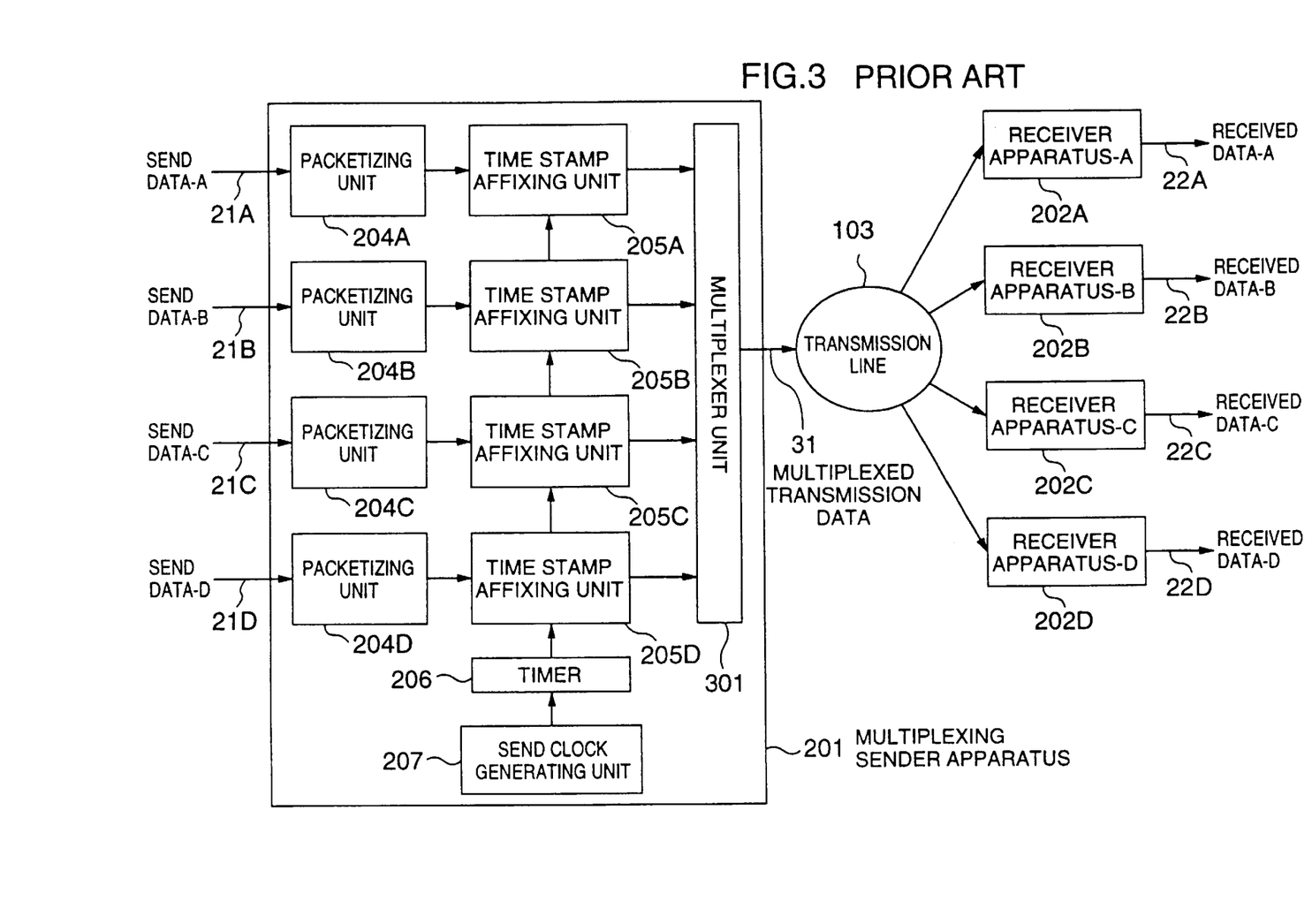
FIG. 3 is a block diagram illustrating a general arrangement of a conventional data transmission system for transmitting data for a plurality of channels by multiplexing.

FIG. 3 is a block diagram showing a general arrangement of a conventional data transmission system implemented by using the transmission technique described above for sending data for a plurality of channels through a single sender apparatus.

Referring to the FIG. 3, a plurality of send data (i.e., data to be sent) 21A, 21B, 21C and 21D are inputted to a multiplexing sender apparatus 201 to be multiplexed and sent via a transmission line 103 to receiver apparatuses 202A, 202B, 202C and 202D corresponding to the aforementioned plural channels, respectively. The received data 22A to 22D are out from the receiver apparatus 202A tot 202D after reception processings performed by the receiver apparatuses 202A to 202D, respectively. At this juncture, it should be mentioned that although each of the receiver apparatuses 202A to 202D may be realized in the same structure as the receiver apparatus 102 described previously by reference to FIG. 2, a channel multiplexing mechanism has to be provided in association with the multiplexing sender apparatus 201.

The send data 21A, 21B, 21C and 21D of the individual channels A, B, C and D are packetized independent of one another by the packetizing units 204A, 204B, 204C and 204D, respectively, and then affixed in the time stamp affixing units 205A to 205D with time stamps generated by a timer 206 operating at a standard clock frequency generated by a send clock generating unit 207, to be subsequently supplied to a multiplexer unit 301. In the multiplexer unit 301, the individual packets undergo time-division multiplexing to be thereby sent out onto a network as the multiplexed data 31 for transmission. In practical applications, however, there may exist such a case that the packetizing units 204A, . . . , 204D and the time stamp affixing units 205A, . . . , 205D are not physically provided for the individual channels, respectively, but a single packetizing unit and a single time stamp affixing unit are operated on a time sharing basis for a plurality of channels. However, from the logical viewpoint, it is safe to say that packetization processings and the time stamp affixation processings are executed on a channel-by-channel basis independently.

The multi-channel multiplexing sender apparatus shown in FIG. 3, however, suffers from a problem with respect to the accuracy of the time stamp affixed to the data for transmission after the multiplexing. Besides, there is a possibility that the transmission data can not be sent out accurately at a desired time point. The background of these problems will be elucidated below by reference to FIG. 4.

Figure 4:
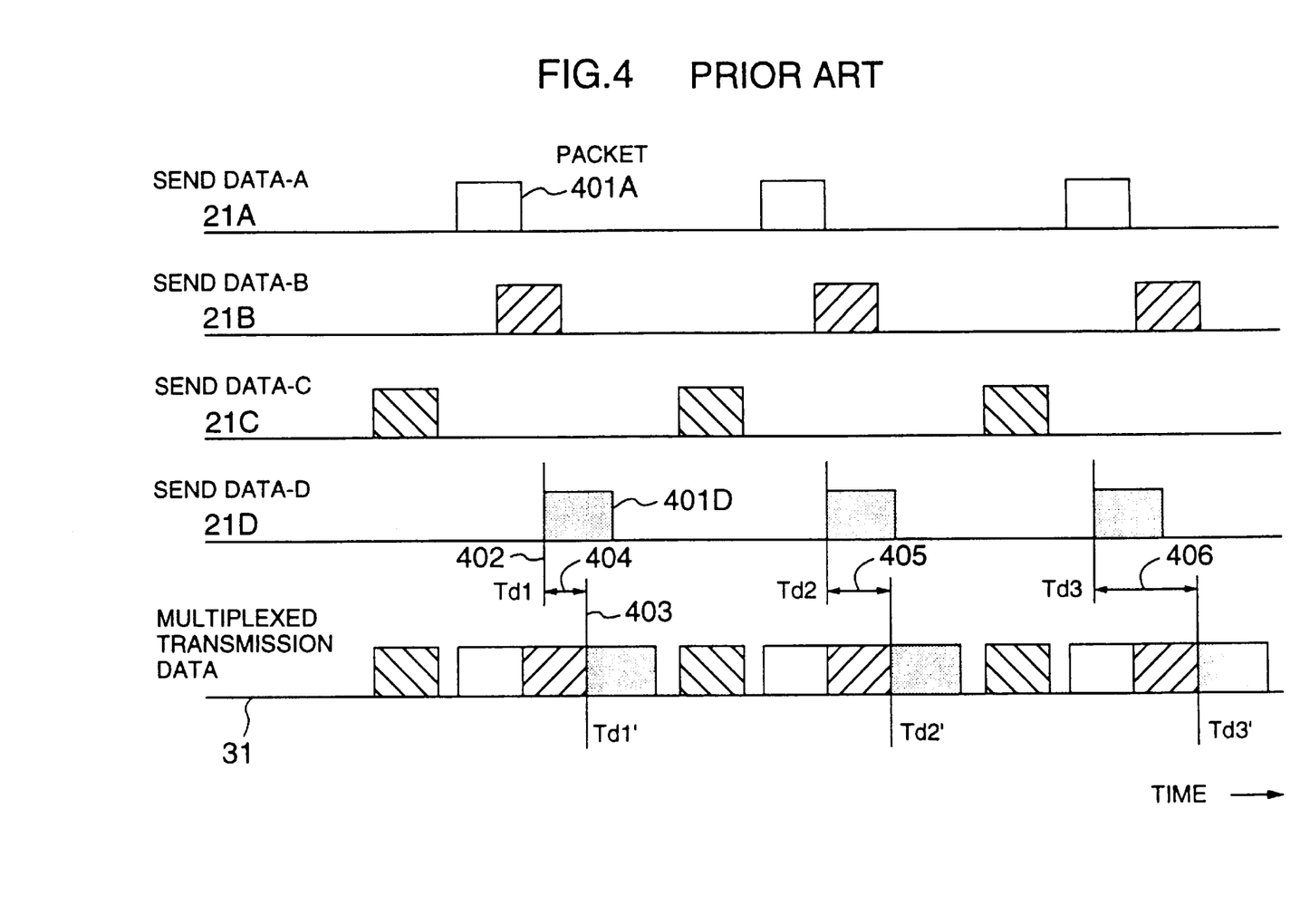
FIG. 4 is a timing chart for illustrating packet sending operation in the packet multiplexing transmission apparatus shown in FIG. 3.

The send data 21A to 21D of the individual channels are packetized by the packetizing units 204A to 204D, respectively, whereby packets 401A, 401D, etc. are generated in the format shown along the time axis in FIG. 4. Upon multiplexing of these packets, competition or contention will take place among the individual channels for the time for transmission. As a result there may incur a situation where the packet can not be sent out immediately in succession to generation thereof. Thus there arises an undesirable situation which will be described below. Taking as an example the packet 401D of the channel D, the packet destined to be sent out at a time point Td1 (designated by reference numeral 402) can not be sent out due to the contention mentioned above but sent out at a time point Td1' (time point 403). Consequently, an appearance of a time difference 404 equivalent to (Td1'−Td1) between the time point at which the time stamp is affixed and the time point at which the packet of concern is actually sent out results. For similar reasons, there may occur time stamp differences or errors 405 and 406, as seen in FIG. 4. Further, there occurs an error in the reception clock at the receiver side because the reception clock is reproduced based on a time stamp which contains an error. In this conjunction, it should be mentioned that the time difference 404 is not of the random-number nature because of influence of the other contending packets. Accordingly, difficulty will be encountered in eliminating such errors because of complicated relations therebetween.

The problems described above can be ascribed to the fact that since the packets are multiplexed after affixing the respective time stamps, the packets are temporarily stored in a buffer (not shown) incorporated in the multiplexer unit 301 for the time interval between the time the packets are affixed with the time stamps and the time they are sent out onto the transmission line or network.

SUMMARY OF THE INVENTION

An object of the present invention to provide a packet multiplexing transmission apparatus which is capable of transmitting the packets with high accuracy.

Another object of the present invention is to provide a sender apparatus for a packet multiplexing transmission apparatus which is so implemented that a time intervening between a time point the time stamp was affixed to the packet and a time point the packet is sent out can remain essentially invariable.

Yet another object of the present invention is to provide a receiver apparatus for a packet multiplexing transmission apparatus which incorporates an apparatus capable of establishing synchronization easily between the sender apparatus and the receiver apparatus.

In view of the above and other objects which will become apparent as the description proceeds, it is proposed according to the teachings of the present invention that in place of multiplexing the data undergone the packetization, the data is packetized after having been multiplexed, which is then followed by the process for affixing the time stamps to the packets as generated. Owing to such arrangement, delay time intervening between the affixation of the time stamp and the sending of the packet affixed with the time stamp can be prevented from variation notwithstanding of the multiplexing.

Thus, according to a general aspect of the present invention, there is provided a packet multiplexing transmission apparatus for packetizing information and multiplexing packets for transmission. The apparatus includes a data store/read-out unit for storing a plurality of data supplied from at least one information source and reading out selectively the data stored for outputting thereof, a packetizing unit for packetizing the data read out from the data store/ readout unit, a time stamp affixing unit for affixing time stamps indicating sending time points to the packetized data, respectively, to thereby send out the packetized data onto a network, a channel managing unit for receiving and managing send request signals issued from the information sources and commanding start of packetization to the packetizing unit, and a sending sequence determining unit for determining a sequence in which a plurality of packets are to be sent out based on start information supplied from the channel managing unit, to thereby control the packetizing unit so that the data are packetized in the determined sequence. In a preferred mode for carrying out the invention, the channel managing unit should be equipped with a table for managing information storing locations for the information stored in the data store/read-out unit.

By virtue of the arrangement described above, the packet generation and the time stamp affixation can be realized at a same rate as the transmission rate. Further, because delay time involved due to the processing is constant, the time stamp error can assume a constant value, easy for compensation or correction. Furthermore, the data to be packetized can be determined in accordance with the time point for transmission immediately before the packetization of the data and packetized thereafter at the time point as determined, which allows the time points for sending out the packetized data to be controlled or managed with high accuracy.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

Now, the present invention will be described in detail in conjunction with what is presently considered as preferred or typical embodiments thereof by reference to the drawings. In the following description, like reference characters designate like or corresponding parts throughout the several views.

Embodiment 1

Figure 1:
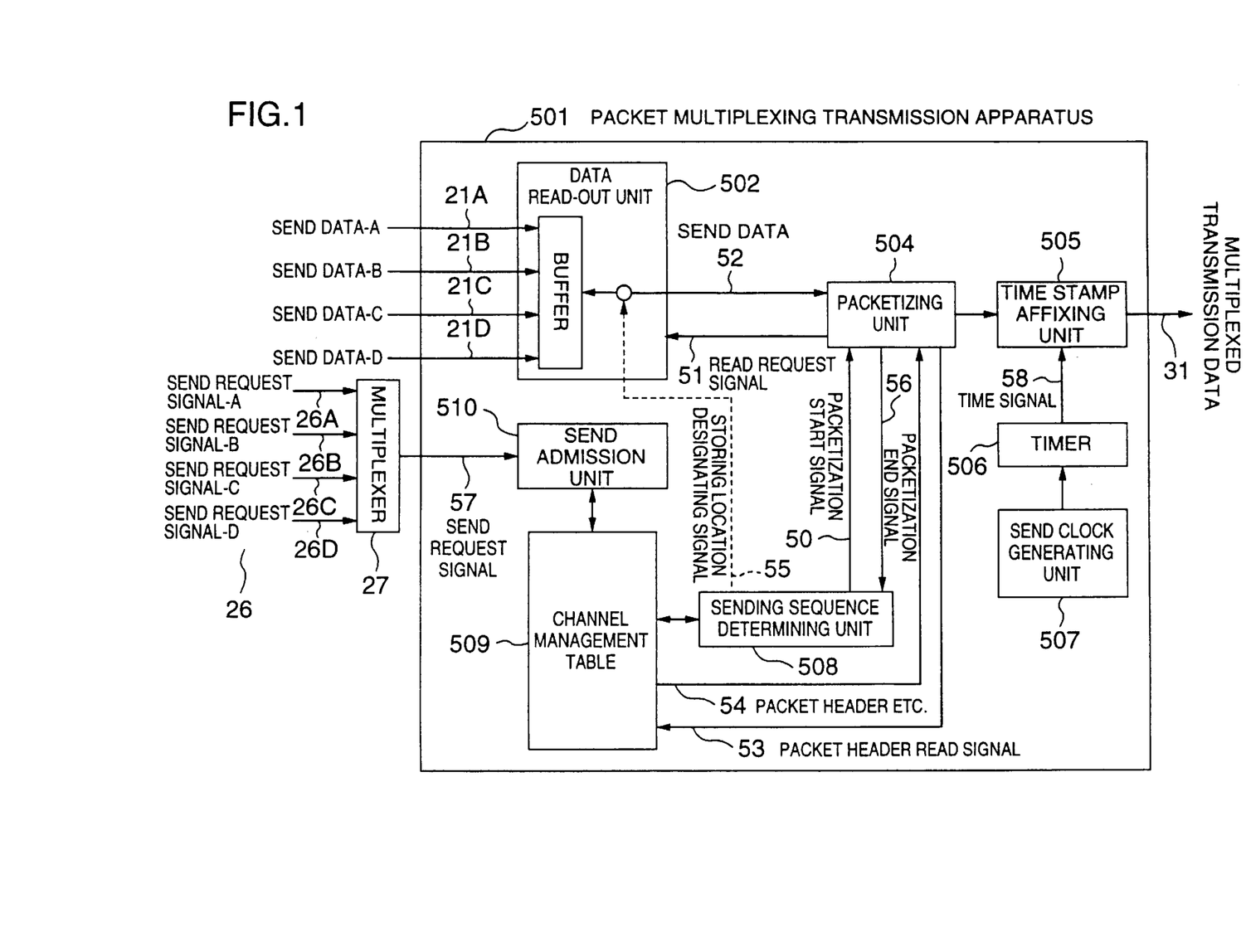
FIG. 1 is a block diagram illustrating a configuration of a packet multiplexing sender system according to a first embodiment of the present invention.

FIG. 1 is a block diagram illustrating a structure of a packet multiplexing transmission apparatus according to a first exemplary embodiment of the present invention. The packet multiplexing transmission apparatus generally denoted by reference numeral 501 is so arranged as to packetize and multiplex send data 21A, 21B, 21C and 21D for a plurality of channels to thereby send out a multiplexed data 31 for transmission onto a network. The send data 21A to 21D are consecutive data supplied from one or more information sources such as, for example, a server apparatus. These data are written in predetermined areas of a buffer memory which is incorporated in a data read-out unit 502.

Send request signals 26A, 26B, 26C and 26D for the individual channels, respectively, are issued from the information source which provides data to be sent and multiplexed by a multiplexer 27 into a send request signal 57, so that the send request signals can be received en bloc by a send admission unit 510. Upon reception of the send request signal 57 by the send admission unit 510, information concerning the channels designated by the information source is registered in a channel management table 509.

Figure 5:
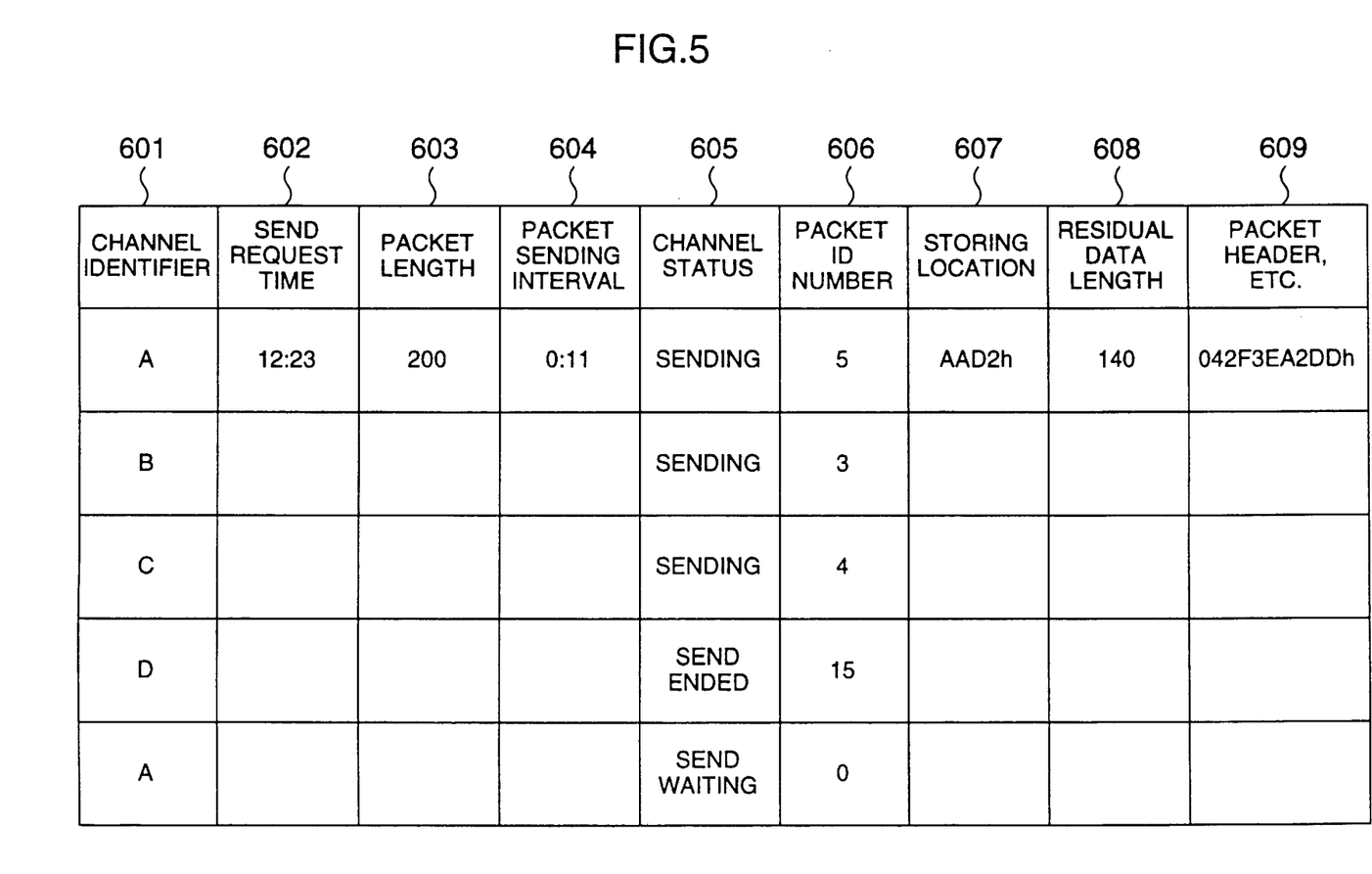
FIG. 5 is a view illustrating a channel management table (509) employed in the apparatus shown in FIG. 1.

FIG. 5 shows an exemplary structure of the channel management table 509. Referring FIG. 5, stored in the channel management table 509 are such information as channel identifiers 601, send request times 602, packet lengths 603, packet sending intervals 604, channel statuses 605 of the relevant channels, packet ID numbers 606, storing locations 607 for the relevant data, residual data lengths 608, additional information 609 such as packet header and the like. In this conjunction, it should however be mentioned that predetermined ones of the information items enumerated above may be omitted.

Written in the entry for the channel status 605 is information indicating the state which the channel for the relevant data to be sent assumes currently, i.e., non-operating state, send waiting state, busy state, sending end state or abnormality occurrence state. In the non-operating state, the relevant data is invalidated. In the send waiting state, sending of the data is reserved until the send request time. In the busy state, the packetization and packet transmission are in progress. Accordingly, packetizing/sending operation is repeated at time points indicated by the send request time information. The sending end state means that there remains no data to be sent out. Finally, the abnormality occurrence state indicates that the relevant channel is shut down du e to some abnormality concerning the data transmission.

The send request signal 57 carries the channel identifier 601, the send request time 602, the packet length 603, the packet sending interval 604, the storing location 607 for the relevant data, the residual data length 608 of the relevant data and the additional information 609 such as the packet header and the like which are to be entered in the channel management table 509. Thus, upon inputting of the send request signal 57, there are written in the channel management table 509 the channel identifier 601 indicating the channel to be used for sending out the packetized data, the send request time 602 for the first or leading packet and the residual data length 608, while the channel status 605 is set to the send waiting state. Further, the packet length 603, the packet sending interval 604, the storing location 607 in the buffer of the data read-out unit 502 in which the relevant data has been stored, the additional information 609 such as the packet header may be written in the channel management table 509, as occasion requires.

Turning back to FIG. 1, a sending sequence determining unit 508 serves for monitoring and managing constantly the channel management table 509 to thereby determine the packet generating sequence and time. More specifically, when the sending sequence determining unit 508 retrieves the channel management table 509 and decides that data to be sent out exists, the sending sequence determining unit 508 supplies a packetization start signal 50 to a packetizing unit 504 while sending a storing location designating signal 55 for the relevant packet data to the data read-out unit 502.

The data read-out unit 502 reads out the data used for packetization from the storing location on the buffer memory designated by the storing location designating signal 55. A packetizing unit 504 issues a packet header read signal 53 in order to read out various data required for the packetization from the channel management table 509, whereby the information 54 such as the packet header or the like information is read out from the channel management table 509 to be used for the packetization. Further, the packetizing unit 504 sends a read request signal 51 to the data read-out unit 502 which responds to the read request signal 51 by supplying send data (i.e., data to be sent or transmitted) 52 to the packetizing unit 504. The send data 52 is then packetized by the packetizing unit 504. The packet thus generated is supplied to a time stamp affixing unit 505 which is designed to generate a time stamp on the basis of a time signal 58 generated by a timer 506 operating at a standard clock frequency generated by a send clock generating unit 507. The time stamp generated is then affixed to the packet generated by the packetizing unit 504. The packets generated through the procedure described previously and affixed with the respective time stamps are transmitted to the receiver apparatus as the multiplexed transmission data 31 via a transmission line.

Figure 6:
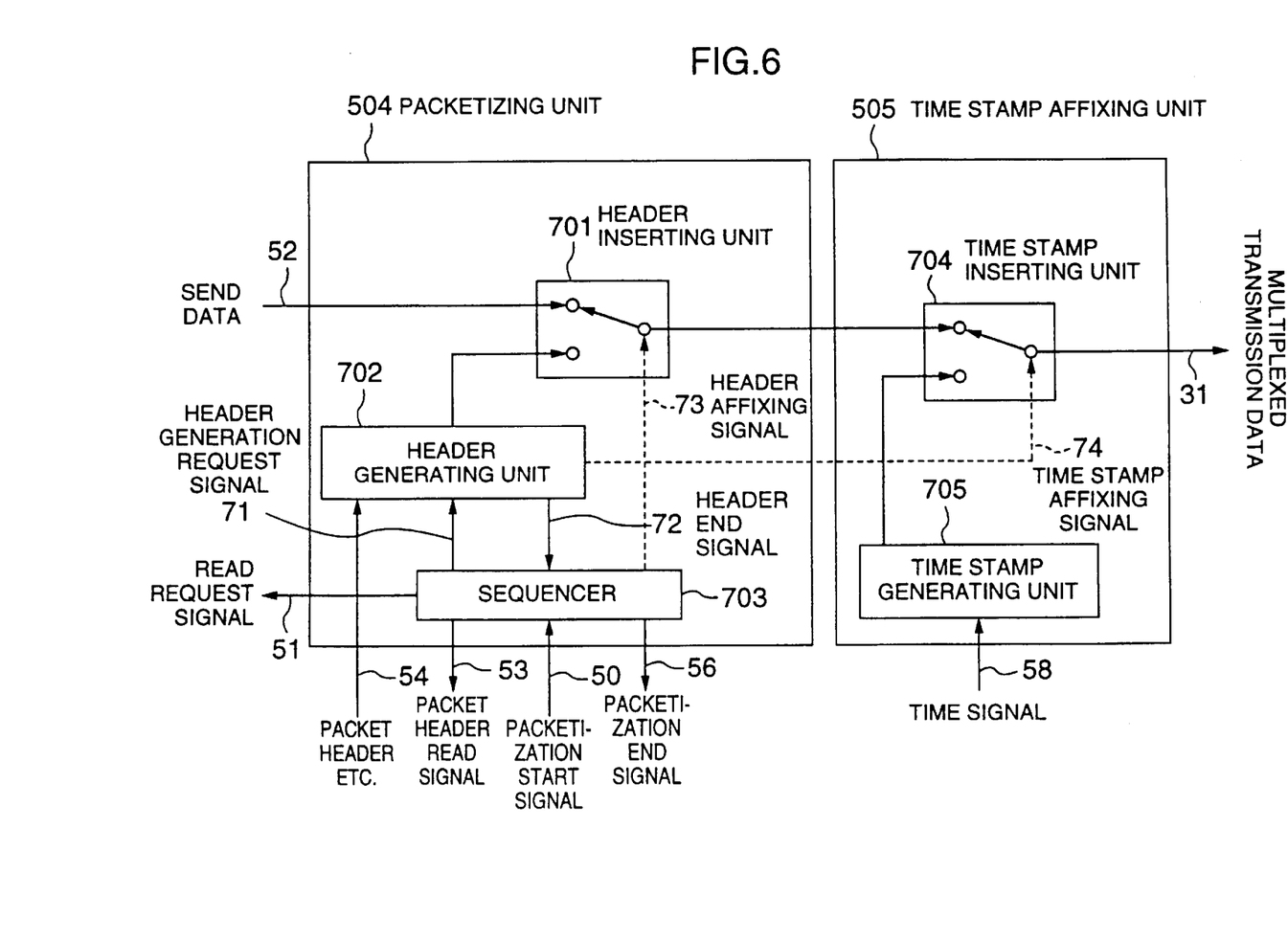
FIG. 6 is a block diagram illustrating in detail a packetizing unit (504) and a time stamp affixing unit (505) in the apparatus shown in FIG. 1.
Figure 7:
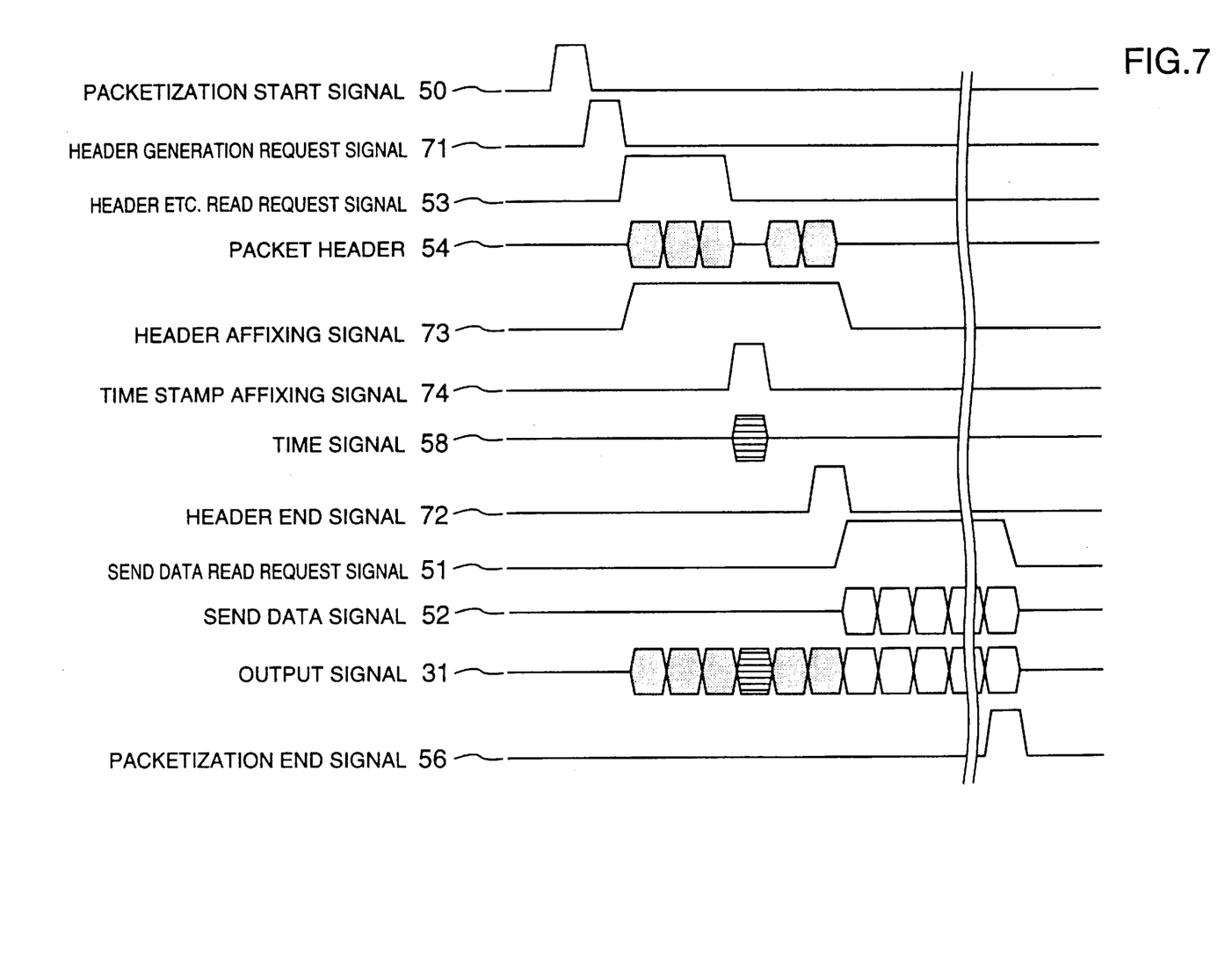
FIG. 7 is a timing chart for illustrating operations of the packetizing unit and the time stamp affixing unit in the apparatus shown in FIG. 1.

Operations of the packetizing unit 504 and the time stamp affixing unit 505 will be described in more concrete by reference to FIGS. 6 and 7. As shown in FIG. 6, the packetizing unit 504 is comprised of a header inserting unit 701, a header generating unit 702 and a sequencer 703. On the other hand, the time stamp affixing unit 505 includes a time stamp inserting unit 704 and a time stamp generating unit 705. At first, upon reception of the packetization start signal 50, the sequencer 703 starts to operate for issuing a header generation request signal 71 to the header generating unit 702. Subsequently, the sequencer 703 generates the packet header read signal 53 at a timing which conforms to the packet header generating timing to thereby read out the packet header information 54 which is required for generating the packet header. Then, the header generating unit 702 generates the packet header on the basis of the packet header information 54, whereon the packet header as generated is supplied to the header inserting unit 701. A header affixing signal 73 is validated at a timing at which the packet header is to be affixed, to thereby allow the header inserting unit 701 to supply the packet header to the time stamp affixing unit 505. In that case, an unoccupied or empty area is provided previously at a location where the time stamp is to be placed. A time stamp affixing signal 74 is sent to the time stamp affixing unit 505 at the timing conforming with the aforementioned empty area. Upon completion of generation of the packet header, the header generating unit 702 issues a header end signal 72, in response to which the sequencer 703 invalidates the header affixing signal 73, while the header inserting unit 701 starts to supply the send data 52 to the time stamp affixing unit 505. Upon completion of the packetization, a packetization end signal 56 is issued to thereby stop the operation of the sequencer 703, which is thus set to the state awaiting the succeeding packetization start signal 50. The time stamp generating unit 705 constituting a part of the time stamp affixing unit 505 generates a time stamp in accordance with the time signal 58. On the other hand, the time stamp inserting unit 704 inserts the time stamp in accordance with the time stamp affixing signal 74 to a time-stamp dedicated location of the data delivered from the packetizing unit 504. The data in which the time stamp has now been inserted are then outputted as the multiplexed transmission data 31.

Figure 8:
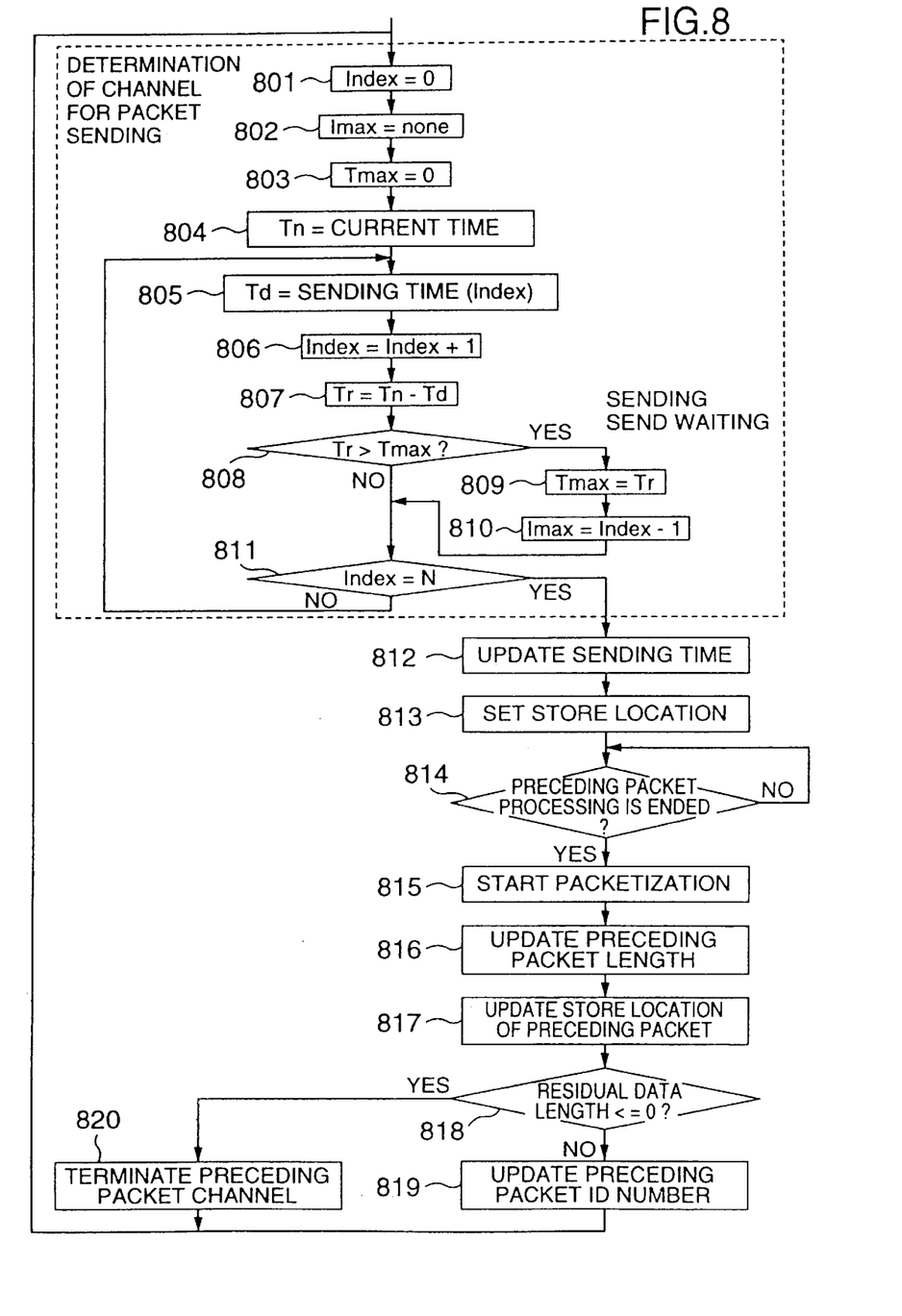
FIG. 8 is a flow chart for illustrating a procedure for sending packets in the packet multiplexing sender apparatus according to the present invention.

Next, by reference to FIG. 8, a packet send algorithm will be described with emphasis being put on operation of the sending sequence determining unit 508. The algorithm of concern is divided into steps for generating and sending a packet and steps for determining the packet to be sent subsequently. In practice, the packet generation and the succeeding packet selecting operation can be executed in parallel for the purpose of enhancing the packet transmission efficient. Parenthetically, the operation for selecting the succeeding packet to be sent next is performed by retrieving the channel management table 509 shown in FIG. 5. At first, as an initialization processing, "0" is placed in a variable Index (in a step 801), "none (empty)" is placed in a variable Imax (in a step 802), "0" is placed in a variable Tmax (step 803) and a current time is placed in a variable Tn (step 804). Subsequently, from the entry of the channel management table 509 determined by the content of the variable Index, the send request time 602 is read out to be placed in a variable Td (step 805), whereupon the variable Index is incremented by "+1" in a step 806.

Subsequently, difference between the current time Tn and the send request time Td is placed in a variable Tr (step 807), whereupon the variable Tmax placed with the value of the variable Tr which is maximum up to the current time point is compared with the value of the variable Tr in a step 808. In case the value of the variable Tr is smaller than or equal to that of the variable Tmax, the processing proceeds to a step 811. If otherwise, the value of the variable Tr is placed in the variable Tmax in a step 809, while the value of a variable "Index−1" is placed in the variable Imax (step 810). Thereafter, decision is made whether the value of the variable Index has reached the number N of entries of the channel management table 509 (step 811). When it is decided that the value of the variable Index has reached the entry number N of the channel management table 509, the procedure proceeds to a step 812. If otherwise, the step 805 is resumed, whereupon the process including the steps 805 to 810 inclusive thereof is executed repeatedly. At a time point when the processing exits the loop mentioned above (i.e., repetitive execution loop of the steps 805 to 810), the data corresponding to the entry of the channel management table 509 which passed by earliest the send request time is determined as the data to be next packetized based on both the identifier Imax and the time value Tmax which are known.

In a step 812, the send request time for the data series to be next sent out is arithmetically determined or calculated based on the send request time 602 for the packet to be sent out and the packet sending interval 604, whereupon the send request time 602 for the new packet is updated in accordance with the result of the calculation. Subsequently, the storing location of the data to be packetized next is read out from the storing locations 607 (step 813), making preparation for the succeeding reading operation. After waiting for completion of the sending operation of the packet which immediately precedes to the packet to be sent out in succession (step 814), the succeeding packetization is started upon completion of the send-out operation of the preceding packet (step 815).

Thereafter, for the data series of the immediately preceding packet for which the send-out operation has been completed, the data length corresponding to that of the packet sent out is subtracted from the residual data length 608 (step 816), whereupon for the data series of the immediately preceding packet for which the send-out operation has been completed, the storing location for the data to be sent in succession is written in the channel management table 509 as the storing location information 607 for the data to be sent in succession (step 817). Thereafter, for the data series of the immediately preceding packet for which the send-out operation has been completed, decision is made whether or not the sending operation of the aforementioned data series has been completed (step 818). When the send-out processing has been completed, the channel status 605 is set to the end state for the entry of the corresponding data (step 820), whereupon the step 801 is resumed. On the contrary, when the decision step 818 results in negation "No", the packet ID number is updated (step 819) to resume the step 801.

In conjunction with the packet multiplexing transmission of the picture or video data, such a scheme is frequently adopted according to which the packet resulting from packetization of the video or picture information is divided into smaller packets or cells for the transmission. As an exemplary application of the present invention, an apparatus for transmitting video information in the form of smaller packets resulting from division of the packet generated through the procedure described above is illustrated in FIG. 9.

Figure 9:
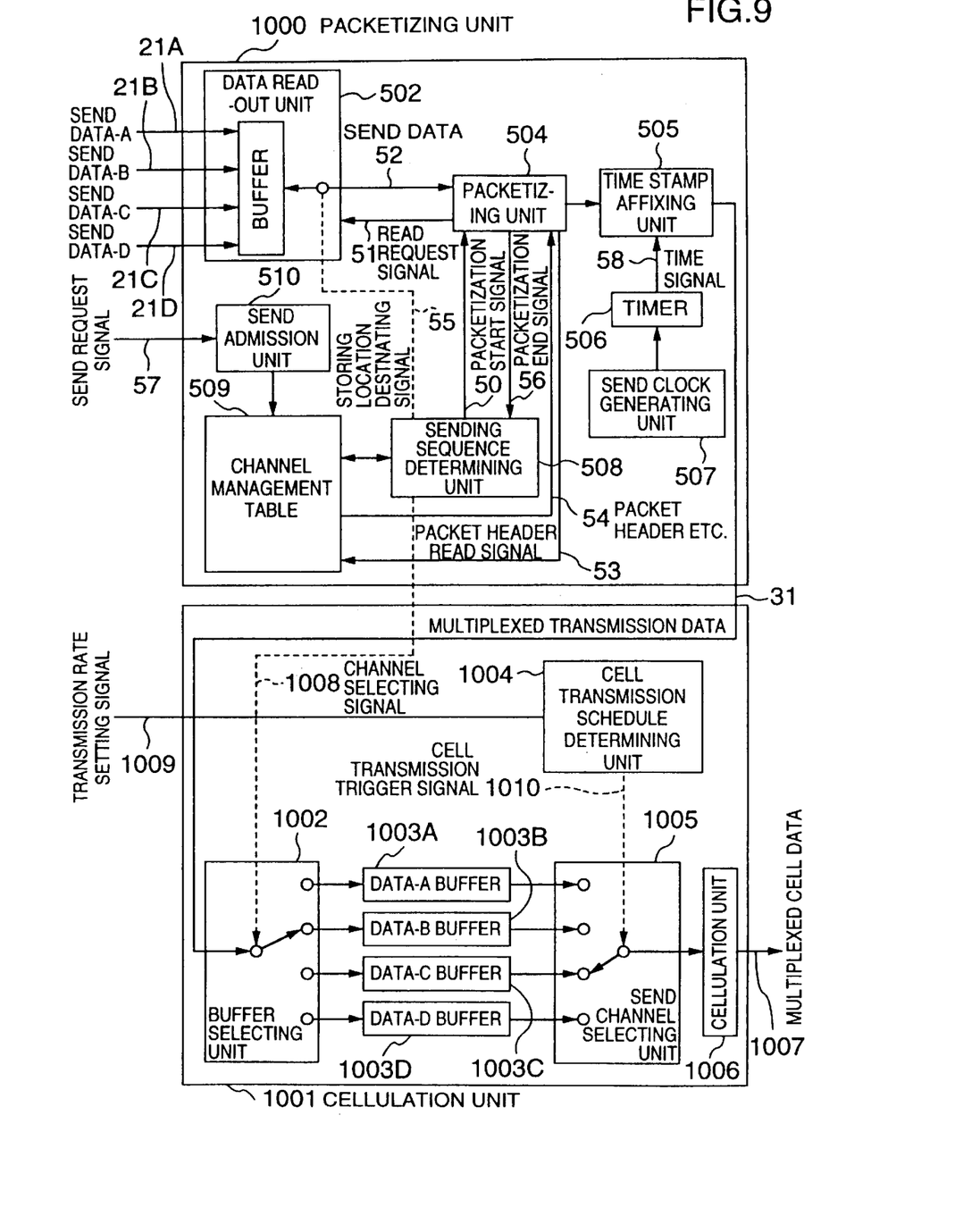
FIG. 9 is a block diagram for illustrating an application of the packet multiplexing sender apparatus according to the present invention.

Referring to FIG. 9, a packetizing unit 1000 is implemented in a same structure as that of the packet multiplexing transmission apparatus 501 shown in FIG. 1, wherein like reference characters are used for designating like or equivalent components. Outputted from the packetizing unit 1000 are multiplexed transmission data 31 which are packets of picture or the like data packetized and multiplexed for a plurality of channels and which includes the packets affixed with respective time stamps. The packet outputted from the packetizing unit 1000 is inputted into a cellulation unit 1001.

The multiplexed transmission data 31 inputted to the cellulation unit 1001 are distributed to data buffers 1003A, 1003B, 1003C and 1003D provided for transmission channels, respectively, to be stored therein. The data buffer selecting unit 1002 receives from the sending sequence determining unit 508 incorporated in the packetizing unit 1000 a channel selecting signal 1008 which indicates a current channel for which the packetizing operation is currently being performed, to thereby determine the buffer to which the packet is to be supplied. Each of the data buffers 1003A, 1003B, 1003C and 1003D is so implemented as to operate as an FIFO (First-In, First-Out) buffer. On the other hand, a cell transmission schedule determining unit 1004 receives a transmission rate setting signal 1009 from a send request source to thereby determine a cell transmission sequence for the individual channels, for thereby issuing a cell transmission trigger signal 1010 to a send channel selecting unit 1005 at a time point for the cell transmission. Upon reception of the cell transmission trigger signal 1010, the send channel selecting unit 1005 reads out the data from one of the data buffers 1003A to 1003D which corresponds to the relevant channel, whereupon the data as read out are supplied to the cellulation unit 1006. The data received by the cellulation unit 1006 are sent out as multiplexed cell data 1007 with header information being affixed thereto.

In the case of the packet multiplexing transmission apparatus illustrated in FIG. 9, the time intervening between affixation of the time stamp and the sending-out operation is not always constant, incurring error of the time stamp, because the packet affixed with the time stamp is stored once in the buffer and then divided into the packets of smaller size or cells for transmission, being multiplexed with those for the other channel(s). In order to suppress such time stamp error to a possible minimum, some measures will have to be taken in conjunction with determination of the cell transmission schedule. An algorithm to this end will be described below.

In the ATM (Asynchronous Transfer Mode) system, cells are transmitted at a constant time interval over a transmission line. Representing this time interval for the transmission by $\Delta$, the time point allowing the cell transmission makes appearance at every time interval $\Delta$, which in turn means that error of the time stamp may amount to the value $\Delta$ at the least. Further, in the case of simultaneous multiplexed cell transmission for a number N of channels, there may make appearance in the worst case an error given by $$Dmax = N \times \Delta$$

because of possibility that the time points for cell transmission may contend with one another.

In this conjunction, it is noted that for any given one of the channels, the other channels to be multiplexed can not be predicated, rendering it impossible to predict the value of the maximum error Dmax. In that case, the time stamp error can not be predicted either. Under the circumstances, according to the present invention, the cell transmission sequence determining rule is determined as follows:

"Whenever contention or conflict occurs in respect to the cell send-out time point, preference is set to the cells for the channel having a higher transmission rate."

By adopting the rule mentioned above, the number Ns of the channels for which the transmission interval T is shorter than a cell transmission interval Ti in a given or i-th channel can be limited as follows:

$$Ns \leq (Ti/\Delta) - 1$$

Accordingly, the maximum delay time can be limited to a value given by:

$$Dmax \leq ((Ti/\Delta) - 1) \times \Delta \leq Ti - \Delta$$

Because above value can be derived on the basis of only the transmission rate of the relevant channel, it is possible to predict a maximum error value of the time stamp before starting the cell data transmission.

Figure 10:
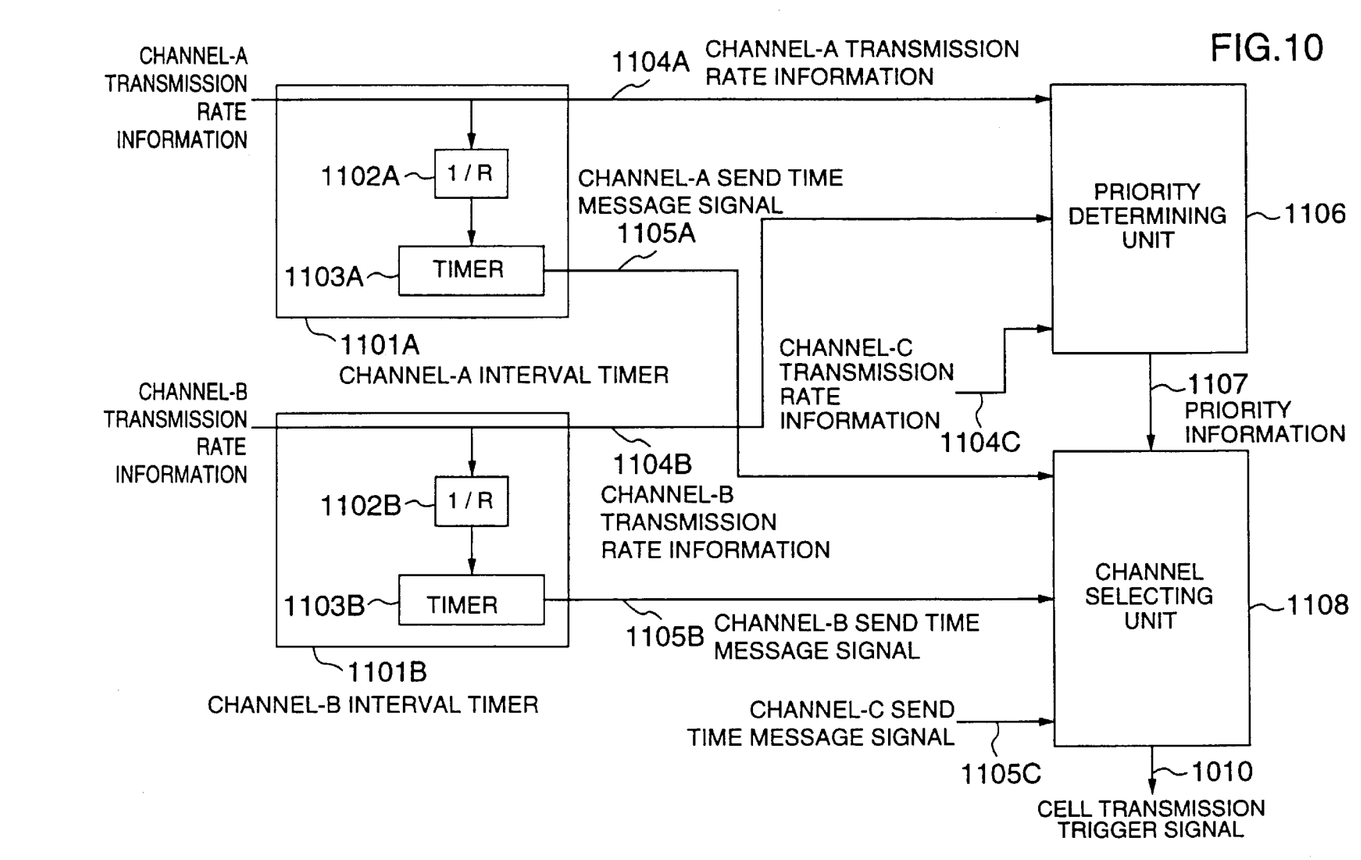
FIG. 10 is a block diagram illustrating in detail a cell transmission schedule determining unit shown in FIG. 9.

FIG. 10 shows a configuration of the cell transmission schedule determining unit 1004. As can be seen from this figure, the cell transmission schedule determining unit 1004 includes interval timers 1101A, 1101B and 1101C (which is however omitted from illustration) provided in correspondence to the individual channels, respectively. They are implemented basically in a same structure. The transmission rate setting signal carries transmission rate information 1104A, 1104B and 1104C for the relevant channels, respectively. Thus, in the interval timer 1101A provided in association with the channel A, a reciprocal unit 1102A determines arithmetically the time interval at which the cell is generated on the basis of the corresponding channel-A transmission rate information 1104A, wherein the time interval determined arithmetically is supplied to a timer 1103A, which responds thereto by generating a channel-A send time message signal 1105A at the time interval as inputted. In a channel selecting unit 1108, the cell transmission trigger signal 1010 is generated in response to each of the send time message signals 1105A, 1105B and 1105C sent from the channel interval timers 1101A and 1101B, respectively. However, when more than one of the send time message signals 1105A, 1105B and 1105C are generated simultaneously, one of the send time message signals 1105A, 1105B and 1105C which is destined for the channel having the highest priority is selected in accordance with priority information 1107 supplied from a priority determining unit 1106. In this manner, the cell transmission trigger signal 1010 is generated sequentially, beginning with the channel allocated with the highest priority. On the other hand, the priority determining unit 1106 determines the priorities of the individual channels on the basis of the channel transmission rate information 1104A, 1104B and 1104C in a sequence, starting from the channel having the highest transmission rate, to thereby output the priority information 1107. The priority sequence is updated every time a new transmission channel is established.

Embodiment 2

Figure 11:
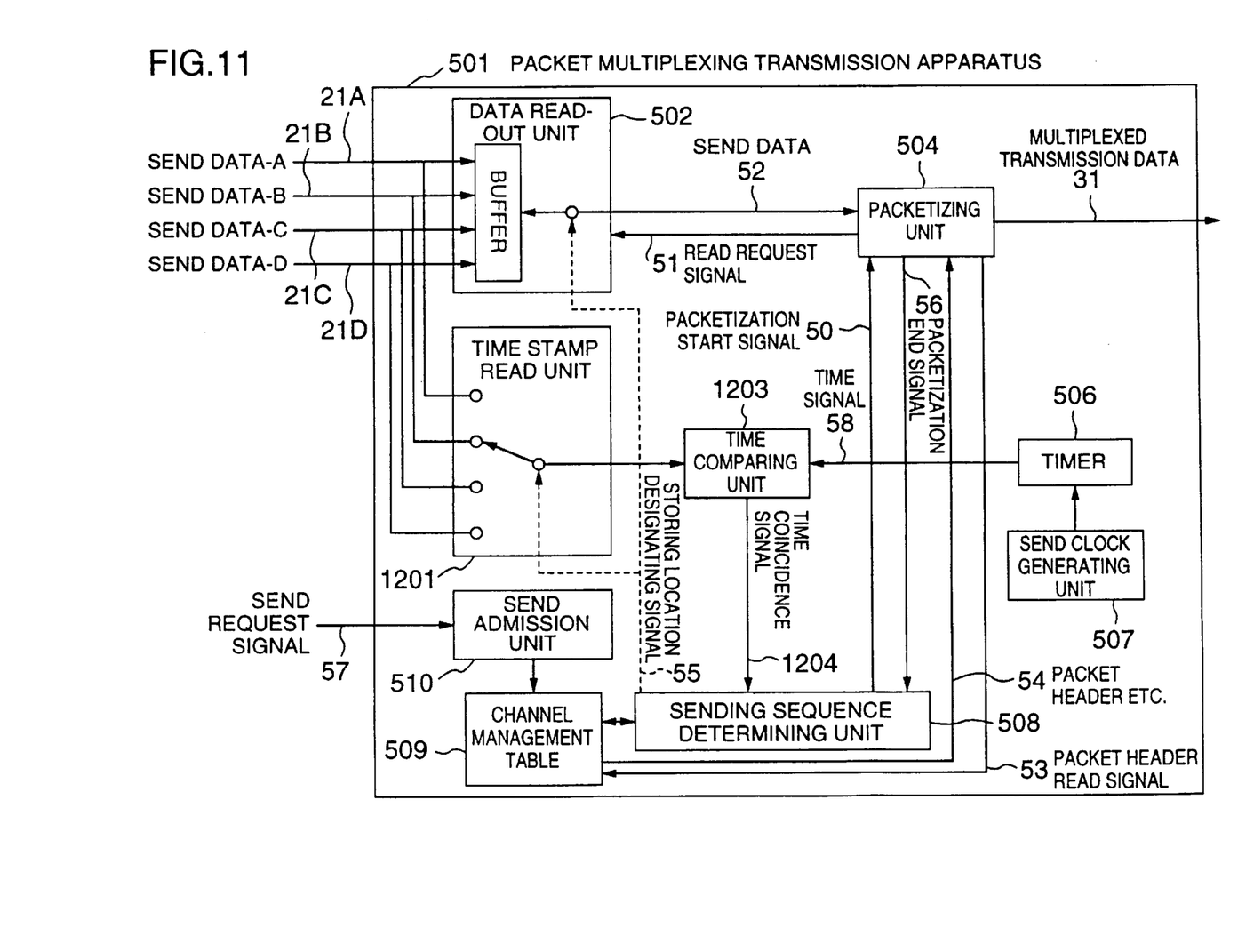
FIG. 11 is a block diagram illustrating a configuration of a packet multiplexing sender apparatus according to a second embodiment of the invention.

FIG. 11 shows a packet multiplexing transmission apparatus according to a second embodiment of the present invention. In the case of the first embodiment of the packet multiplexing transmission apparatus, the time stamp is affixed to the packet upon generation thereof. By contrast, the packet multiplexing transmission apparatus according to the second embodiment of the invention, the information or data series affixed previously with the time stamp is sent out at a time point indicated by that time stamp. The operation principle underlying the second embodiment of the invention will be described below in detail. The system configuration shown in FIG. 11 differs from that shown in FIG. 1 in that the time stamp affixing unit 505 is spared and that a time stamp read-out unit 1201 and a time comparing unit 1203 are additionally provided. Operation of the packet multiplexing transmission apparatus shown in FIG. 11 is essentially same as that of the apparatus shown in FIG. 1 except for the operation relating to the time stamp, to which the following description will be directed.

When the channel destined for the succeeding packet transmission is determined by the sending sequence determining unit 508, then the data for the relevant channel, i.e., either the send data 21A, 21B, 21C and 21D, are read out by a time stamp read-out unit 1201. This data is of a great length as in the case of the video data and previously affixed with a time stamp. The data is then supplied to a time comparing unit 1203 to be compared with the time generated by the timer 506 for deciding whether the time indicated by the time stamp coincides with the time generated by the timer 506 or the former is past the latter. If so, a time coincidence signal 1204 is generated to cause the sending sequence determining unit 508 to generate the packetization start signal 50. If otherwise, generation of the time coincidence signal 1204 is inhibited. The sending sequence determining unit 508 then checks the other channels as to the packet transmission. When none of these channels have reached the transmission-ready state, then the first channel is again checked. This routine is repeated until any one of the channels have reached the transmission enabling time point. In this manner, packetization can be started in conformance with the time indicated by the time stamp. The operation or processing succeeding to the packetizing operation is essentially same as in the case of the packet multiplexing transmission apparatus shown in FIG. 1. In the packet multiplexing transmission apparatus according to the second embodiment of the invention, the time intervening between the decision as to coincidence of the time designated by the time stamp and the packet send-out can be held constant so long as no contention with other channel occurs with regard to the packet send timing.

As will now be appreciated from the foregoing description, the delay time involved in generation of the packet, affixing of the time stamp and send-out of the packet can be held constant or fixed according to the teachings of the present invention, whereby accuracy of the time stamp is improved, which in turn means that the receiving clock can easily be reproduced at the receiver side in synchronism with the sending clock. Furthermore, because the sending time can accurately be managed, the data to be sent can be transmitted properly at a time point when the receiver apparatus requests the data. Thus, burden for data storage in the receiver apparatus can be mitigated. In this way, in the packet transmission, for example, of video/sound information, the reception quality can be enhanced with the time delay involved being suppressed to a minimum.

Many modifications and variations of the present invention are possible in the light of the above techniques. It is therefore to be understood that within the scope of the appended claims, the invention may be practiced otherwise than as specifically described.

I claim:

1. A packet multiplexing transmission apparatus for packetizing information and multiplexing packets for transmission, comprising:

data store/read-out means for storing a Plurality of data supplied from at least one information source and reading out selectively the stored data for outputting thereof;

packetizing means for packetizing the data read out from said data store/read-out means;

time stamp affixing means for affixing time stamps indicating sending time points to said packetized data, respectively, to thereby send out said data onto a network; and channel managing means for receiving and managing send request signals issued from said at least one information source and commanding start of said packetization to said packetizing means, wherein said channel managing means comprises:

a table for managing information storing locations for the information stored in said data store/read-out means.

2. A packet multiplexing transmission apparatus for packetizing information and multiplexing packets for transmission, comprising:

data store/read-out means for storing a plurality of data supplied from at least one information source and reading out selectively the stored data for outputting thereof;

packetizing means for packetizing the data read out from said data store/read-out means;

time stamp affixing means for affixing time stamps indicating sending time points to said packetized data, respectively to thereby send out said data onto a network;

channel managing means for receiving and managing send request signals issued from said at least one information source and commanding start of said packetization to said packetizing means; and sending sequence determining means for determining a sequence in which a plurality of packets are to be sent out based on start information supplied from said channel managing means, to thereby control said packetizing means so that said data are packetized in said determined sequence.

3. A packet multiplexing transmission apparatus according to claim 2, further comprising:

cellulation means for cellularizing the packet sent out with said time stamp being affixed into cells for multiplex transmission thereof.

4. A packet multiplexing transmission apparatus according to claim 3, wherein when contention occurs in respect to time for sending out said cells, said cellulation means validates cellulation with priority for a channel of higher transmission rate.

5. A method of packetizing information in an apparatus for packetizing a plurality of information for multiplex transmission thereof, said method comprising the steps of:

storing a plurality of data supplied from at least one information source;

selecting data to be packetized from said plurality of stored data based on a send request signal supplied from said information source;

packetizing the selected data;

affixing to each of said packetized data time stamps indicating sending time points for said packetized data, respectively; and sending out said packetized data onto a network, wherein said selecting step comprises the steps of:

comparing a sending time contained in said send request signal supplied from said information source with a current time point, and selecting the data of a channel for which the result of said comparison shows that a time for starting sending operation has been reached.

6. A data packetizing method according to claim 5, further comprising the steps of:

providing a management table for storing information contained in the send request signal supplied from said information source, said management table containing information concerning the sending time point and packet header.

7. A data packetizing method according to claim 6, wherein said management table further stores information concerning sending status of packet so that starting timing of the packetizing is controlled based on the sending status.

* * * * *